United States Patent

[11] 3,627,426

[72] Inventors: Tadao Tsuruta; Norio Shiotake; Yoshinobu Ito, all of Tokyo, Japan
[21] Appl. No.: 806,236
[22] Filed: Mar. 11, 1969
[45] Patented: Dec. 14, 1971
[73] Assignee: Nippon Kogaku K.K. Tokyo, Japan
[32] Priority: Mar. 14, 1968
[33] Japan
[31] 43/16219

[54] HOLOGRAM INTERFEROMETER WITH TWO REFERENCE BEAMS
8 Claims, 6 Drawing Figs.

[52] U.S. Cl. .................................. 356/109, 350/3.5
[51] Int. Cl. .................................. G01b 9/02, G01b
[50] Field of Search .......................... 350/3.5; 356/106

[56] References Cited
OTHER REFERENCES

Polarizing Holography; Bryngdahl; Apr. 1967
Three Beam Holographic Interferometry; Sevigny et al., Appl. Optics, Oct 1967.
Birefringent Beam Splitting for Holography; Caulfield et al., Review of Sci. Inst.; July 1967.
Surface Deformation Measurement Using the Wavefront Reconstruction Technique; Haines et al.; Appl. Optics., Apr. 1966.
Mul.-Wave. & Mul.-Source Holo. Appl. to Bn. Generation; Hildebrand et al.; Josa. 2–1967.

*Primary Examiner*—Ronald L. Wibert
*Assistant Examiner*—Conrad Clark
*Attorney*—Anton J. Wille ABSTRACT: A method and apparatus are provided for obtaining interference fringes in a double exposure hologram interferometer using two collimated reference beams capable of restoring clear interference fringes on an object which undergoes lateral translation between the exposures, by a slight rotation of one of the image-reconstructing beams on the reconstruction process to one of the images exactly over the other. Polarization beam-splitting elements such as a Savart plate can be adopted to tilt the images and to give rise to fringe patterns favorable for the analysis of the changes in height of the object between the exposures. Retardation between the images is also provided by translation of the hologram.

HOLOGRAM INTERFEROMETER WITH TWO REFERENCE BEAMS

This invention relates to a hologram interferometer utilizing two reference light beams. One of the recently developed applications of holography is to reconstruct simultaneously two images of wave fronts recorded on one photographic plate at a time interval apart and in superimpose relation thereby obtaining interference patterns or fringes which indicate the light retardation or light path differences between the two images. The feature of this invention is that only the deformation or dimensional deviations of a subject can be selectively shown in the form of interference patterns or fringes however irregular the surface of the subject may be or rough enough for scattering the lights incident thereupon. However, according to the conventional method of the type described, only one interference pattern is created from one hologram and it has been so far impossible to shear, tilt or retard the interferring light waves so that this method has been presenting problems in practical application.

According to the present invention, the double images reconstructed from one hologram can be modified by the above described three operations of shearing, tilting and retardation whereby clear interference patterns best suited in form for observation and measurement can be created.

In holographic interferometry studies, there have been known three techniques: real-time method, time-lapsed method and time-average method. In the real-time method, the image reconstructed from a hologram is superimposed upon the original subject to observe in real time the changes occuring in the subject. This method is extremely difficult to apply in practice because of the contraction of the emulsion layer of the hologram, the necessity of maintaining for a long time the interferometry system used in recording the original subject as it is until the image is reconstructed and the very high sensitivity to mechanical deformations. In the double exposed or time-lapsed method, two conditions of the same subject are exposed so as to be recorded on a hologram in time-lapsed relation. The interference patterns or fringes are frozen in the hologram. Therefore, upon illumination by a laser beam, the interference patterns or fringes can be immediately reconstructed so that this method is convenient in practice. However, in this method only one interference pattern photo is obtained. When the subject is displaced in the lateral direction between two exposures or when such displacements are different depending upon the portions or the surface of the subject, clear interference fringes cannot be obtained nor can poor interference fringes be remedied furthermore, it is impossible to change the interference patterns or fringes into the form best suited for observation or measurement by providing an angular deviation between the reference beams after exposures and in reconstructions in contrast to the conventional interferometry and the use of ordinary lights. Therefore, the primary object of the present invention is to provide a double-exposed or time-lapsed interferometer which can eliminate the above described defects and disadvantages.

The present invention will be apparent from the following explanation referring to illustrative embodiments shown in the attached drawing, in which.

Figure 1:
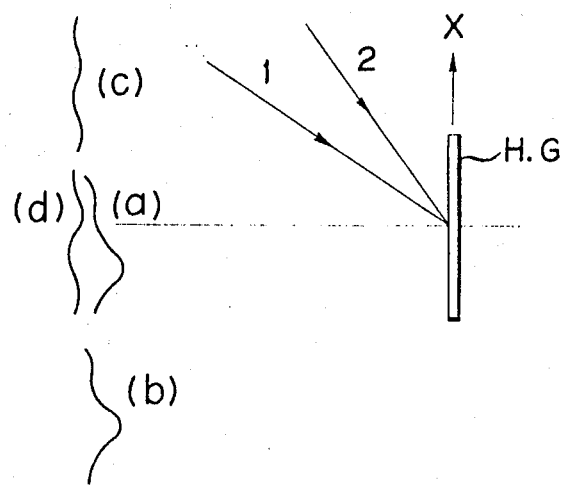
FIG. 1 is a drawing showing the principle of the present invention.

Referring to FIG. 1, when a hologram which was made by two coherent reference beams is illuminated by the same reference beams the reconstructed wave front or image (a) recorded by the reference beam 1 and reconstructed by this beam and another reconstructed wave front or image (d) of a subject recorded and reconstructed by the reference beam spatially coincide with each other. In this case if there is any minute variations in the dimensions between these two reconstructed wave fronts, interference patterns with contour lines will appear. Also in this case, the reconstructed wave front (b) of subject recorded by the reference 1 and reconstructed by the reference beam 2 and another reconstructed wave front (c) of the subject image recorded by the reference beam 2 and reconstructed by the illumination of the reference beam 1 appear adjacent to the reconstructed wave fronts (a) and (d) as spurious images, but these reconstructed wave fronts (b) and (c) can be prevented from superimposing upon the reconstructed wave fronts (a) and (d) by suitably selecting the angle between the two reference beams 1 and 2. If the coincidence of the reconstructed wave fronts (a) and (d) is not obtained, either of the reference beams may be slightly rotated so as to obtain the coincidence therebetween, thereby obtaining clear interference patterns.

When two wave fronts of reference beams illuminating the hologram are arranged so as to intersect with each other at right angles in reconstructing wave fronts, two reconstructed wave fronts can be polarized with respect to the each other by using a suitable polarizing element such as square light path Sagnac interferometer using Banning type polarizing half mirror (P.M.), uniaxial crystal plate, Savart plate (S.P.), etc. This will be hereinafter described in more detail with reference to one preferred embodiment of the present invention.

When the hologram (H.G.) is displaced in a transverse direction indicated by the arrow, light retardation, that is a predetermined difference in the paths of the light from the two reconstructed wave fronts can be provided in the field of vision. Thus, the interference patterns may be displaced to a suitable position and in this case the movements and displacements of the displaced interference patterns can be accurately known from the displacement of the hologram H.G. by the coincidence method.

Figure 2:
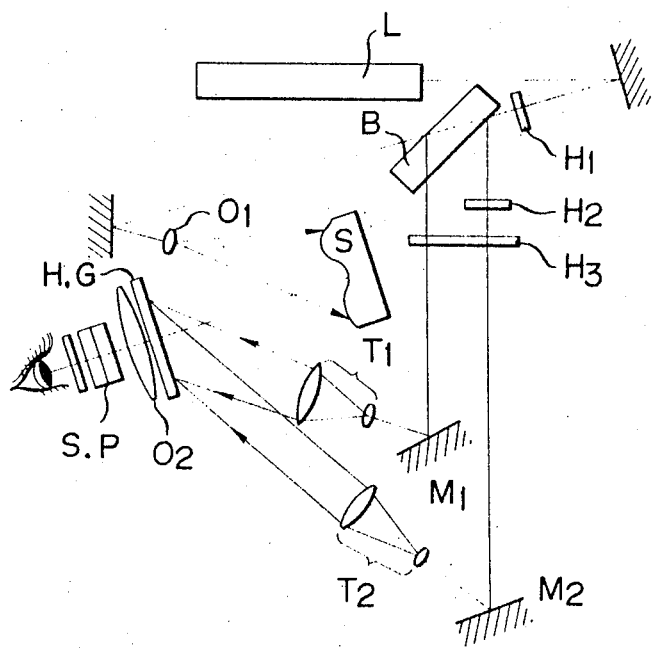
FIG. 2 is a schematic view illustrating one preferred embodiment of the present invention.

Referring to FIG. 2, the reference beam from a laser L is split into three beams by a parallel planar glass B. The beams reflected by the front and rear surfaces of the glass B are linearly polarized and are reflected by reflecting mirrors M1 and M2 respectively. The diameters of the beams are enlarged by reverse telescopes T1 and T2 respectively so as to illuminate the hologram plate as reference beams. On the other hand, the beam passing through the glass B is widened by a lens $O_1$ so as to illuminate the subject S. A half-wave length plate $H_1$ serves to vary the ratio of the intensity of the subject illuminating light to those of the reference beams. The first condition of the subject S is recorded by the reference beam 1 while the second condition is recorded by the reference beam 2. In reconstruction of wave fronts from the recorded hologram, the hologram is disposed at the same position where this hologram was made and is illuminated by the two reference beams. In this case the interference patterns due to the difference in optical light paths between the first and second conditions are superimposed upon the thus reconstructed two wave fronts. If there is any lateral displacement or deviation between the two conditions or when the hologram H.G. is located at a position slightly deviated from the position where this hologram was made, no interference patterns will appear or the patterns will exhibit only low contrast. In this case, one of the two reference beams is inclined with respect to the other so as to vary the angle of incidence upon the hologram H.G. so that the portions to be examined or studied of the two reconstructed wave fronts can be completely superimposed with each other. Then, the interference patterns indicating the variations of the heights can be clearly obtained.

Figures 3A, 3B, 3C:
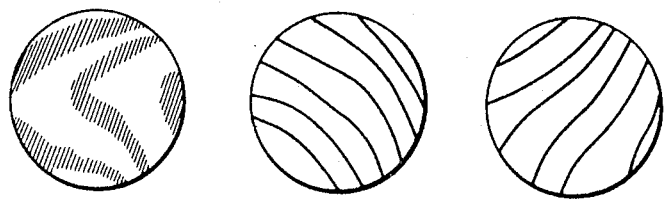
FIG. 3a, 3b and 3c are by way of illustrating the interference fringes obtained.
Figure 4:
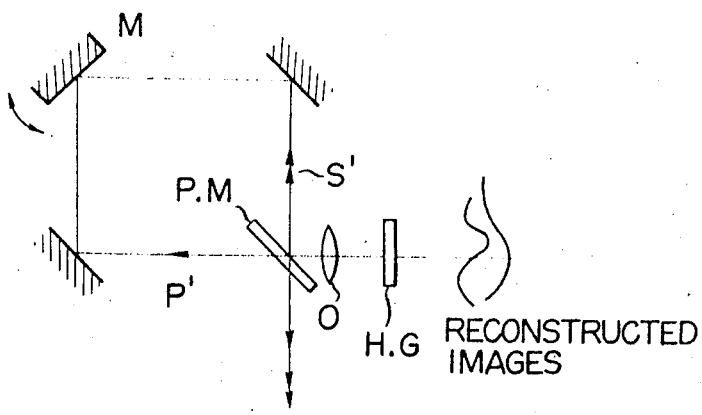
FIG. 4 is a schematic view illustrating another preferred embodiment of the present invention for providing an angular deviation between the reconstructed images.

When either of the reference beams illuminating the hologram H.G. is rotated through 90° by a wave plate $H_2$ the light emanated from the reconstructed wave fronts have two orthogonal oscillation planes of the light waves. Behind hologram H.G. is disposed an objective lens $O_2$ in such a manner that its focal point coincides with the reconstructed wave fronts. When the reconstructed wave fronts are viewed through a Savart plate SP, equidistantly spaced apart parallel fringes due to the Savart plate SP are superimposed upon the first interference patterns (FIG. 3a). The deviation from the straight fringe lines generates the contour lines along the fringes of the interference patterns indicating the deviation of the condition. (See FIG. 3b) When a wave plate $H_3$ and the two oscillation planes of the two reference beams are rotated while the above described orthogonal relation therebetween can be maintained and when the Savart plate SP is rotated in response to the rotation of the wave plate $H_3$, the directions of the fringes can be changed as shown in FIG. 3c. The same result can be attained by the square optical path interferometer using a polarizing half mirror PM as shown in FIG. 4. In this case, the half mirror PM reflects the S' component of the polarized light while permitting the P' component to pass therethrough so that the lights emanating from the two reconstructed wave fronts advance in the clockwise and counterclockwise directions respectively before they are superimposed or combined. When a mirror M is slightly rotated, the two reconstructed wave fronts are inclined with respect to each other, thereby producing the change of fringes from FIG. 3a to FIG. 3b. An objective lens 0 serves to prevent the lateral deviation between the two reconstructed wave fronts due to the inclination.

As described hereinabove, according to the present invention a hologram interferometer having the same functions of shearing, tilting and retardation as in the case of the conventional interferometers can be provided with the aid of the treated hologram. The interferometer of the present invention is particularly advantageous in the experiments of dynamic phenomena because the lateral displacement of a subject before and after a force has been applied thereto can be compensated and the measurement of the lateral displacement can be made simultaneously with the photography of contour lines. Furthermore, the interference patterns or fringes may be arbitrarily changed to facilitate the observation, so that the interferometer of the present invention is best suited for the precise measurement of the pressure distribution in front and behind shock waves in aerodynamic studies.

What is claimed is:

1. A hologram interferometer comprising, means for forming a double exposure hologram of two conditions in any object by means of two reference beams incident upon the hologram at different angles, one exposure being made with one reference beam and the other exposure made with the other reference beam, means for laterally displacing said object from its position during the first condition to a different position during its second condition, means tilting one of said reference beams relative to the other, during reconstruction of the hologram and means for reconstituting the image of the object from the hologram whereby clear interference fringes are obtained.

2. A hologram interferometer according to claim 1, further comprising,
means for polarizing said reference beams relative to each other, and
means for viewing said reconstituted image including polarizing and double image focusing means.

3. A hologram interferometer according to claim 1, wherein said means for tilting one of said reference beams includes means to vary the angle of incidence of one of said reference beams.

4. A hologram interferometer according to claim 2, wherein said means to polarize includes wave plates located in the path of said reference beams capable of rotating the azimuth of polarization by 90°, and said means for viewing includes a Savart plate and an objective lens.

5. A hologram interferometer according to claim 1 further comprising, means for laterally displacing said hologram to a second position during the reconstruction from a hologram.

6. A method of obtaining interference fringes in a double exposed hologram interferometer comprising, making first and second reference beams incident upon a hologram at different angles of incidence with each other; recording a subject with the first reference beam and successively recording said subject with the second reference beam after said subject undergoes a physical change; reconstructing simultaneously the two images of said subject by illuminating the recorded and processed hologram by said two beams; and causing either of the two beams to tilt with respect to the other in order to compensate the lateral displacement between the reconstructed images which results from misalignment of the hologram or from the lateral movement of the subject between the successive exposure whereby the reconstructed images are completely coinciding thereby obtaining clear interference fringes.

7. A method of obtaining interference fringes according to claim 6, wherein during the reconstructing of the images the two beams are made linearly polarized with their direction of polarization at right angles to each other and angularly deviating the two reconstructed images relative to each other to obtain interference fringes.

8. A method obtaining interference fringes according to claim 6, further including the step of displacing said hologram laterally to move the interference fringes relative to the subject.